United States Patent
Pelletier et al.

(10) Patent No.: US 9,772,054 B2
(45) Date of Patent: Sep. 26, 2017

(54) CONCENTRIC FLEXIBLE HOSE ASSEMBLY

(71) Applicant: Parker-Hannifin Corporation, Cleveland, OH (US)

(72) Inventors: Robert R. Pelletier, Chardon, OH (US); Antony William Newman, Leicestershire (GB); Andrew E. Mau, Longmeadow, MA (US); Jonathan M. Golightly, Fort Worth, TX (US); John M. Obeidin, Fort Worth, TX (US); Peter J. Stroempl, Lexington, TN (US)

(73) Assignee: Parker-Hannifin Corporation, Cleveland, OH (US)

( * ) Notice: Subject to any disclaimer, the term of this patent is extended or adjusted under 35 U.S.C. 154(b) by 433 days.

(21) Appl. No.: 14/215,247

(22) Filed: Mar. 17, 2014

(65) Prior Publication Data

US 2014/0261839 A1 Sep. 18, 2014

Related U.S. Application Data

(60) Provisional application No. 61/793,112, filed on Mar. 15, 2013.

(51) Int. Cl.
| | |
|---|---|
| *F16L 39/00* | (2006.01) |
| *F16L 39/02* | (2006.01) |
| *F16L 39/06* | (2006.01) |
| *F16L 11/20* | (2006.01) |
| *F16L 19/02* | (2006.01) |
| *F16L 33/207* | (2006.01) |

(52) U.S. Cl.
CPC ........... *F16L 11/20* (2013.01); *F16L 19/0231* (2013.01); *F16L 33/2073* (2013.01); *F16L 39/02* (2013.01); *F16L 39/00* (2013.01)

(58) Field of Classification Search
CPC ......... F16L 39/00; F16L 39/005; F16L 39/02; F16L 39/06
USPC ............. 285/122.1, 123.1, 123.15, 904, 256, 285/123.3, 386
See application file for complete search history.

(56) References Cited

U.S. PATENT DOCUMENTS

| | | | |
|---|---|---|---|
| 1,363,320 | A | 12/1920 | Horiuchi |
| 2,070,291 | A | 2/1937 | McHugh |
| 2,363,586 | A | 11/1944 | Guarnaschelli |
| (Continued) | | | |

FOREIGN PATENT DOCUMENTS

| | | |
|---|---|---|
| EP | 1736651 | 10/2010 |
| JP | 09-280073 | 10/1997 |

*Primary Examiner* — Phi A
*Assistant Examiner* — Omar Hijaz
(74) *Attorney, Agent, or Firm* — Renner, Otto, Boisselle & Sklar, LLP

(57) ABSTRACT

Provided is a flexible hose assembly having an inner nipple coupled to an inner flexible hose and an outer nipple at least partially surrounding the inner nipple and being coupled to an outer flexible hose, wherein a first fluid flowing through the inner nipple is directed outward in-between the inner and outer flexible hoses and a second fluid flowing in-between the inner and outer nipples is directed inward to the inner flexible hose. By directing the second fluid inward and the first flow outward, the outer flexible hose is prevented from collapsing on the inner flexible hose when pressure of the second fluid flowing through the inner flexible hose is greater than a pressure of the first fluid flowing through the outer flexible hose.

20 Claims, 19 Drawing Sheets

(56) References Cited

U.S. PATENT DOCUMENTS

| | | | |
|---|---|---|---|
| 2,391,063 A * | 12/1945 | Madsen | F16L 37/0985 285/114 |
| 2,475,635 A | 7/1949 | Parsons | |
| 2,752,579 A | 6/1956 | Caldwell et al. | |
| 2,787,481 A * | 4/1957 | Van Orden | F16L 13/007 285/148.11 |
| 3,105,708 A | 10/1963 | Esty | |
| 3,186,488 A * | 6/1965 | Johnson | E21B 33/035 138/89 |
| 3,285,007 A | 11/1966 | Carlisle et al. | |
| 3,691,765 A | 9/1972 | Carlisle | |
| 3,713,588 A | 1/1973 | Sharpe | |
| 3,820,827 A * | 6/1974 | Boelkins | F16L 37/23 285/123.1 |
| 4,305,255 A | 12/1981 | Davies et al. | |
| 4,467,610 A | 8/1984 | Pearson et al. | |
| 4,474,014 A | 10/1984 | Markowski | |
| 5,062,792 A | 11/1991 | Maghon | |
| 5,263,314 A | 11/1993 | Anderson | |
| 5,423,178 A | 6/1995 | Mains | |
| 5,427,419 A | 6/1995 | Frey et al. | |
| 5,570,580 A | 11/1996 | Mains | |
| 6,305,476 B1 | 10/2001 | Knight | |
| 6,950,441 B1 | 9/2005 | Kaczmarczyk et al. | |
| 7,028,483 B2 | 4/2006 | Mansour et al. | |
| 7,107,773 B2 | 9/2006 | Little | |
| 7,305,830 B2 | 12/2007 | Fish | |
| 7,762,073 B2 | 7/2010 | Li et al. | |
| 7,849,693 B2 | 12/2010 | Bainville et al. | |
| 2002/0152751 A1 | 10/2002 | Mandai et al. | |
| 2003/0066568 A1 | 4/2003 | Hibino et al. | |
| 2004/0050057 A1 | 3/2004 | Bland et al. | |
| 2004/0255589 A1 | 12/2004 | Yoshida et al. | |
| 2005/0050899 A1 | 3/2005 | Little | |
| 2005/0160717 A1 | 7/2005 | Sprouse et al. | |
| 2005/0229604 A1 | 10/2005 | Chen | |
| 2006/0101814 A1 | 5/2006 | Saitoh et al. | |
| 2007/0006590 A1 | 1/2007 | Muldoon et al. | |
| 2007/0079885 A1 | 4/2007 | Zaborszki et al. | |
| 2007/0204622 A1 | 9/2007 | Patel et al. | |
| 2007/0241560 A1 * | 10/2007 | Malone | F16L 9/19 285/319 |
| 2008/0000214 A1 | 1/2008 | Kothnur et al. | |
| 2008/0036203 A1 * | 2/2008 | Piccinali | F16L 13/141 285/256 |
| 2008/0066720 A1 | 3/2008 | Piper et al. | |
| 2008/0072599 A1 | 3/2008 | Morenko et al. | |
| 2008/0083223 A1 | 4/2008 | Prociw et al. | |
| 2009/0113893 A1 | 5/2009 | Li et al. | |
| 2009/0211256 A1 | 8/2009 | Williams | |
| 2010/0050645 A1 | 3/2010 | Haggerty | |
| 2010/0051726 A1 | 3/2010 | Houtman et al. | |
| 2010/0071663 A1 | 3/2010 | Patel et al. | |
| 2010/0096037 A1 | 4/2010 | Lee et al. | |
| 2010/0115966 A1 | 5/2010 | Nagai et al. | |
| 2010/0186829 A1 * | 7/2010 | Guerineau | F02M 55/002 137/312 |
| 2010/0264652 A1 * | 10/2010 | Mitterer | F16L 3/22 285/397 |
| 2010/0326080 A1 | 12/2010 | Rogers et al. | |
| 2011/0067402 A1 | 3/2011 | Wiebe et al. | |
| 2011/0162373 A1 | 7/2011 | Intile et al. | |
| 2012/0049512 A1 * | 3/2012 | Hayes, Jr. | F16L 19/0283 285/256 |
| 2012/0145247 A1 * | 6/2012 | Pelletier | F16L 11/22 137/1 |
| 2015/0061282 A1 * | 3/2015 | Faldt | A61M 39/18 285/124.5 |

* cited by examiner

CONCENTRIC FLEXIBLE HOSE ASSEMBLY

RELATED APPLICATIONS

This application claims the benefit of U.S. Provisional Application No. 61/793,112 filed Mar. 15, 2013, which is hereby incorporated herein by reference.

FIELD OF INVENTION

The present invention relates generally to gas turbine engines, and more particularly to flexible hose assemblies for gas turbine engines having multiple circuits.

BACKGROUND

A gas turbine engine typically includes one or more fuel injectors for directing fuel from a manifold to a combustion chamber of a combustor. Each fuel injector typically has an inlet fitting connected either directly or via tubing or a hose to the manifold, a tubular extension or stem connected at one end to the fitting, and one or more fuel injectors connected to the other end of the stem for directing the fuel into the combustion chamber. A fuel passage (e.g., a tube or cylindrical passage) extends through the stem to supply the fuel from the inlet fitting to the injector. Appropriate valves and/or flow dividers can be provided to direct and control the flow of fuel through the injector and/or fuel passage. Fuel injectors can include one or more fuel circuits.

SUMMARY OF INVENTION

The present invention provides a flexible hose assembly having an inner nipple coupled to an inner flexible hose and an outer nipple at least partially surrounding the inner nipple and being coupled to an outer flexible hose, wherein a first fluid flowing through the inner nipple is directed outward in-between the inner and outer flexible hoses and a second fluid flowing in-between the inner and outer nipples is directed inward to the inner flexible hose. By directing the second fluid inward and the first flow outward, the outer flexible hose is prevented from collapsing on the inner flexible hose when pressure of the second fluid flowing through the inner flexible hose is greater than a pressure of the first fluid flowing through the outer flexible hose. Additionally, by directing the second fluid inward and the first flow outward, the inner flexible hose can be provided with a smaller diameter than if the main circuit was flowing through the inner flexible hose, thereby providing a compact concentric hose assembly.

According to one aspect of the invention, a flexible hose assembly configured to be coupled to a manifold is provided. The flexible hose assembly includes an inner hose assembly having a first inner nipple having a proximal portion and a distal portion and a first bore extending from the proximal portion to an inner portion of the inner nipple, an inner flexible hose for conveying fluid through a first fluid passage formed interiorly of the inner flexible hose, the inner flexible hose having an end surrounding at least a portion of the distal portion of the first inner nipple and being coupled thereto, and a connector surrounding at least a portion of the flexible hose and the distal portion of the first inner nipple and being coupled to the nipple and the flexible hose. The hose assembly also includes an outer hose assembly having a first outer nipple at least partially surrounding the first inner nipple and being coupled thereto, the first outer nipple having a proximal portion and a distal portion and a passage extending from the proximal portion to the distal portion, an outer flexible hose surrounding the inner flexible hose and having an end surrounding at least a portion of the distal portion of the first outer nipple and being coupled thereto, the outer flexible hose forming with an outer wall of the inner flexible hose a second fluid passage, and a connector surrounding at least a portion of the outer flexible hose and the distal portion of the first outer nipple and being coupled to the first outer nipple and the outer flexible hose.

The first inner nipple has one or more diverging passages extending outwardly from the bore at the inner portion to an outer surface of the inner nipple.

The hose assembly further includes one or more flats on an outer surface of the first inner nipple for each of the one or more diverging passages, wherein the one or more flats define with an inner surface of the first outer nipple a first flow path from the diverging passages to the distal portion of the first inner nipple.

The hose assembly further includes one or more converging passages extending inwardly from the outer surface of the first inner nipple to a second bore extending from a second inner portion of the first inner nipple to the distal portion of the first inner nipple.

The hose assembly further includes one or more flats on the outer surface of the first inner nipple on the proximal portion for each of the one or more converging passages, wherein the one or more flats and a portion of the outer surface of the first inner nipple downstream of the one or more flats define with the inner surface of the first outer nipple a second flow path from the proximal portion of the first inner nipple to the converging passages.

Fluid flowing through the first bore does not communicate with fluid flowing through the second bore.

A path for a first fluid to the first fluid passage is formed by the second flow path defined by the one or more flats on the outer surface of the first inner nipple on the proximal portion and the inner surface of the first outer nipple, the one or more converging passages, and the second bore.

A path for a second fluid to the second fluid passage is formed by the first bore, the one or more diverging passages, and the first flow path defined by the one or more flats on the outer surface of the first inner nipple and the inner surface of the first outer nipple.

The inner and outer flexible hoses each include at least one metal layer and at least one PTFE layer.

The hose assembly further includes one or more aligning rings for providing internal support for the outer flexible hose while also allowing for flow of fluid through the second fluid passage.

The hose assembly further includes a fitting coupled to the first outer nipple and configured to be coupled to the manifold.

The inner hose assembly further includes a second inner nipple having a proximal portion and a distal portion and a passage extending from the proximal portion to the distal portion in fluidic communication with the first flow passage, wherein the inner flexible hose has an other end surrounding at least a portion of the distal portion of the second inner nipple and being coupled thereto, and a connector surrounding at least a portion of the inner flexible hose and the distal portion of the second inner nipple and being coupled to the inner flexible hose and the second inner nipple.

The outer hose assembly further includes a second outer nipple at least partially surrounding the second inner nipple, the second outer nipple having a proximal portion and a distal portion and a passage extending from the proximal portion to the distal portion, wherein the outer flexible hose has an other end surrounding at least a portion of the distal portion of the second outer nipple and being coupled thereto, and a connector surrounding at least a portion of the outer flexible hose and the distal portion of the second outer nipple and being coupled to the second outer nipple and the outer flexible hose.

The second inner nipple includes one or more flats on an outer surface of the second inner nipple, wherein the one or more flats and a portion of the outer surface of the second inner nipple downstream of the one or more flats define with an inner surface of the second outer nipple a flow path from the distal portion of the second outer nipple to the proximal portion of the second outer nipple.

The hose assembly further includes a fitting coupled to the second outer nipple and configured to be coupled to an injector.

A fuel manifold for a gas turbine engine is provided in combination with the flexible hose assembly, wherein the fuel manifold includes one or more manifold fittings surrounding a manifold hose, and wherein respective flexible hose assemblies are coupled to each of the one or more manifold fittings.

According to another aspect of the invention a flexible hose assembly configured to be coupled to a manifold is provided, the flexible hose assembly including an inner hose assembly having an inner nipple and an inner flexible hose coupled to the inner nipple, the inner flexible hose having an interiorly formed first fluid passage for conveying fluid therethrough, and an outer hose assembly having an outer nipple at least partially surrounding the inner nipple and an outer flexible hose coupled to the outer nipple and surrounding the inner flexible hose, the outer flexible hose forming with an outer wall of the inner flexible hose a second fluid passage, wherein the inner nipple includes one or more diverging passages for directing fluid flowing through the inner nipple outward to the second fluid passage and one or more converging passages for directing fluid flowing in-between the inner and outer nipples inward to the first fluid passage.

The inner nipple has a proximal portion and a distal portion and a first bore extending from the proximal portion to an inner portion of the inner nipple, and wherein the outer nipple has a proximal portion and a distal portion and a passage extending from the proximal portion to the distal portion.

The one or more diverging passages extend outwardly from the bore at the inner portion to an outer surface of the inner nipple.

The flexible hose assembly further includes one or more flats on the outer surface of the inner nipple for each of the one or more diverging passages, wherein the one or more flats define with an inner surface of the outer nipple a first flow path from the diverging passages to the distal portion of the inner nipple.

The one or more converging passages extend inwardly from the outer surface of the inner nipple to a second bore extending from a second inner portion of the inner nipple to the distal portion of the inner nipple.

The flexible hose assembly further includes one or more flats on the outer surface of the inner nipple on the proximal portion for each of the one or more converging passages, wherein the one or more flats and a portion of the outer surface of the inner nipple downstream of the one or more flats define with the inner surface of the outer nipple a second flow path from the proximal portion of the inner nipple to the converging passages.

A path for a first fluid to the first fluid passage is formed by the second flow path defined by the one or more flats on the outer surface of the inner nipple on the proximal portion and the inner surface of the outer nipple, the one or more converging passages, and the second bore.

A path for a second fluid to the second fluid passage is formed by the first bore, the one or more diverging passages, and the first flow path defined by the one or more flats on the outer surface of the inner nipple and the inner surface of the outer nipple.

According to still another aspect of the invention, a method of delivering fuel from a manifold through a flexible hose assembly to a fuel injector is provided, the flexible hose assembly including an inner flexible hose coupled to an inner nipple and an outer flexible hose coupled to an outer nipple, the outer flexible hose and outer nipple at least partially surrounding the inner flexible hose and the inner nipple respectively. The method includes delivering a first fuel circuit to first passage formed interiorly of the inner nipple, delivering the first fuel circuit from the first passage to a second passage formed between an outer surface of the inner nipple and an inner surface of the outer nipple, delivering the first fuel circuit to the injector through a third passage formed by the outer flexible hose and an outer wall of the inner flexible hose, delivering a second fuel circuit to a fourth passage that is separate from the second fuel passage formed between the outer surface of the inner nipple and the inner surface of the outer nipple, delivering the second fuel circuit from the fourth passage to a fifth passage formed interiorly of the nipple that is separate from the first passage, and delivering the second fuel circuit to the injector through a sixth passage formed interiorly of the inner flexible hose.

According to still another aspect of the invention, a flexible hose assembly configured to be coupled to a fuel manifold is provided, the flexible hose assembly including an inner flexible hose for conveying fuel through a first fuel passage formed interiorly of the inner flexible hose, and an outer flexible hose surrounding the inner flexible hose and forming with an outer wall of the inner flexible hose a second fuel passage, wherein the inner and outer flexible hoses each include at least one metal layer and at least one PTFE layer.

The flexible hose assembly further includes one or more aligning rings for providing internal support for the outer flexible hose while also allowing for flow of fuel through the second fuel passage.

According to yet another aspect of the invention, a nipple assembly is provided that includes an inner nipple having a proximal portion and a distal portion, a bore extending from the proximal portion to an inner portion of the inner nipple, and one or more diverging passages extending outwardly from the bore at the inner portion to an outer surface of the inner nipple, and an outer nipple surrounding the inner nipple, the outer nipple having a proximal portion and a distal portion and a bore extending from the proximal portion to the distal portion, wherein the inner and outer nipples are coupled together at the distal portions.

The nipple assembly further includes one or more flats on an outer surface of the inner nipple for each of the one or more diverging passages, wherein the one or more flats define with an inner surface of the outer nipple a first flow path from the diverging passages to the distal portion of the inner nipple.

The nipple assembly further includes one or more converging passages extending inwardly from the outer surface of the inner nipple to a second bore extending from a second inner portion of the inner nipple to the distal portion of the inner nipple.

The nipple assembly further includes one or more flats on the outer surface of the inner nipple on the proximal portion for each of the one or more converging passages, wherein the one or more flats define with the inner surface of the outer nipple a second flow path from the proximal portion of the inner nipple to the converging passages.

According to a further aspect of the invention, an inner tube portion is provided that includes an inner nipple having a proximal portion and a distal portion, a bore extending from the proximal portion to an inner portion of the inner nipple, and one or more diverging passages extending outwardly from the bore at the inner portion to an outer surface of the inner nipple, a flexible hose surrounding at least a portion of the distal portion of the inner nipple and coupled thereto, and a connector surrounding at least a portion of the flexible hose and the distal portion of the inner nipple and being coupled to the nipple and the flexible hose.

The inner tube portion further includes one or more flats on an outer surface of the inner nipple for each of the one or more diverging passages, wherein the one or more flats define with an inner surface of an outer nipple a first flow path from the diverging passages to the distal portion of the inner nipple.

The inner tube portion further includes one or more converging passages extending inwardly from the outer surface of the inner nipple to a second bore extending from a second inner portion of the inner nipple to the distal portion of the inner nipple.

The inner tube portion further includes one or more flats on the outer surface of the inner nipple on the proximal portion for each of the one or more converging passages, wherein the one or more flats define with the inner surface of the outer nipple a second flow path from the proximal portion of the inner nipple to the converging passages.

The foregoing and other features of the invention are hereinafter described in greater detail with reference to the accompanying drawings.

DETAILED DESCRIPTION

Figure 1:
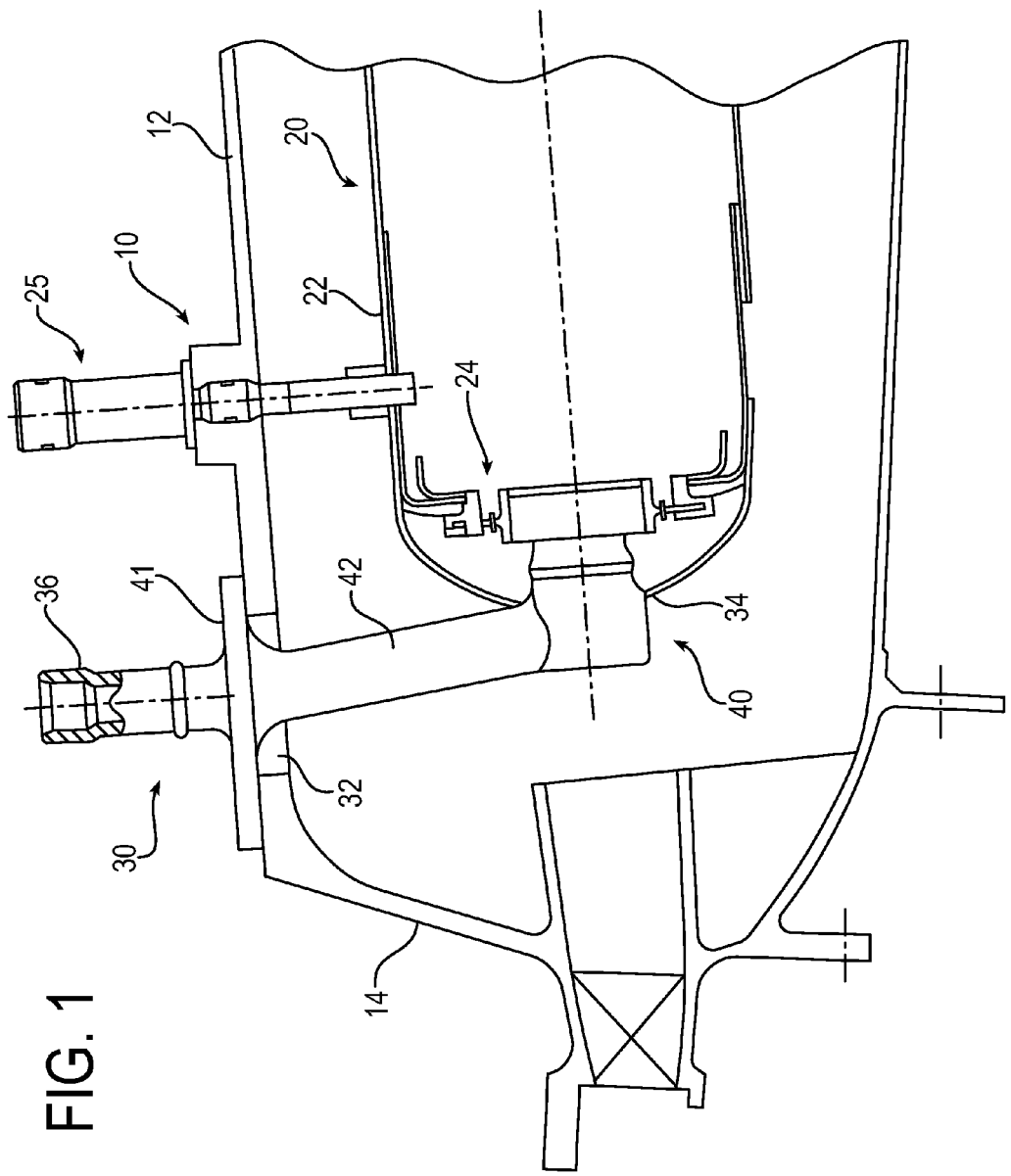
FIG. 1 is a cross-sectional view of a portion of an exemplary gas turbine engine illustrating a fuel injector in communication with a combustor.

Referring now in detail to the drawings and initially to FIG. 1, a gas turbine engine for an aircraft is illustrated generally at 10. The gas turbine engine 10 includes an outer casing 12 extending forwardly of an air diffuser 14. The casing 12 and diffuser 14 enclose a combustor, indicated generally at 20, for containment of burning fuel. The combustor 20 includes a liner 22 and a combustor dome, indicated generally at 24. An igniter, indicated generally at 25, is mounted to the casing 12 and extends inwardly into the combustor 20 for igniting fuel. The above components can be conventional in the art and their manufacture and fabrication are well known.

A fuel injector, indicated generally at 30, is received within an aperture 32 formed in the engine casing 12 and extends inwardly through an aperture 34 in the combustor liner 22. The fuel injector 30 includes a fitting 36 exterior of the engine casing 12 for receiving fuel, as by connection to a fuel manifold 44 (FIG. 2) via a flexible hose assembly 70 (FIG. 3); a fuel nozzle tip assembly, indicated generally at 40, disposed within the combustor 20 for dispensing fuel; and a housing 42 interconnecting and structurally supporting the nozzle tip assembly 40 with respect to fitting 36. The fuel injector 30 is suitably secured to the engine casing 12, as by means of an annular flange 41 that may be formed in one piece with the housing 42 proximate the fitting 36. The flange 41 extends radially outward from the housing 42 and includes appropriate means, such as apertures, to allow the flange 41 to be easily and securely connected to, and disconnected from, the casing 12 of the engine using, for example, bolts or rivets.

Figure 2:
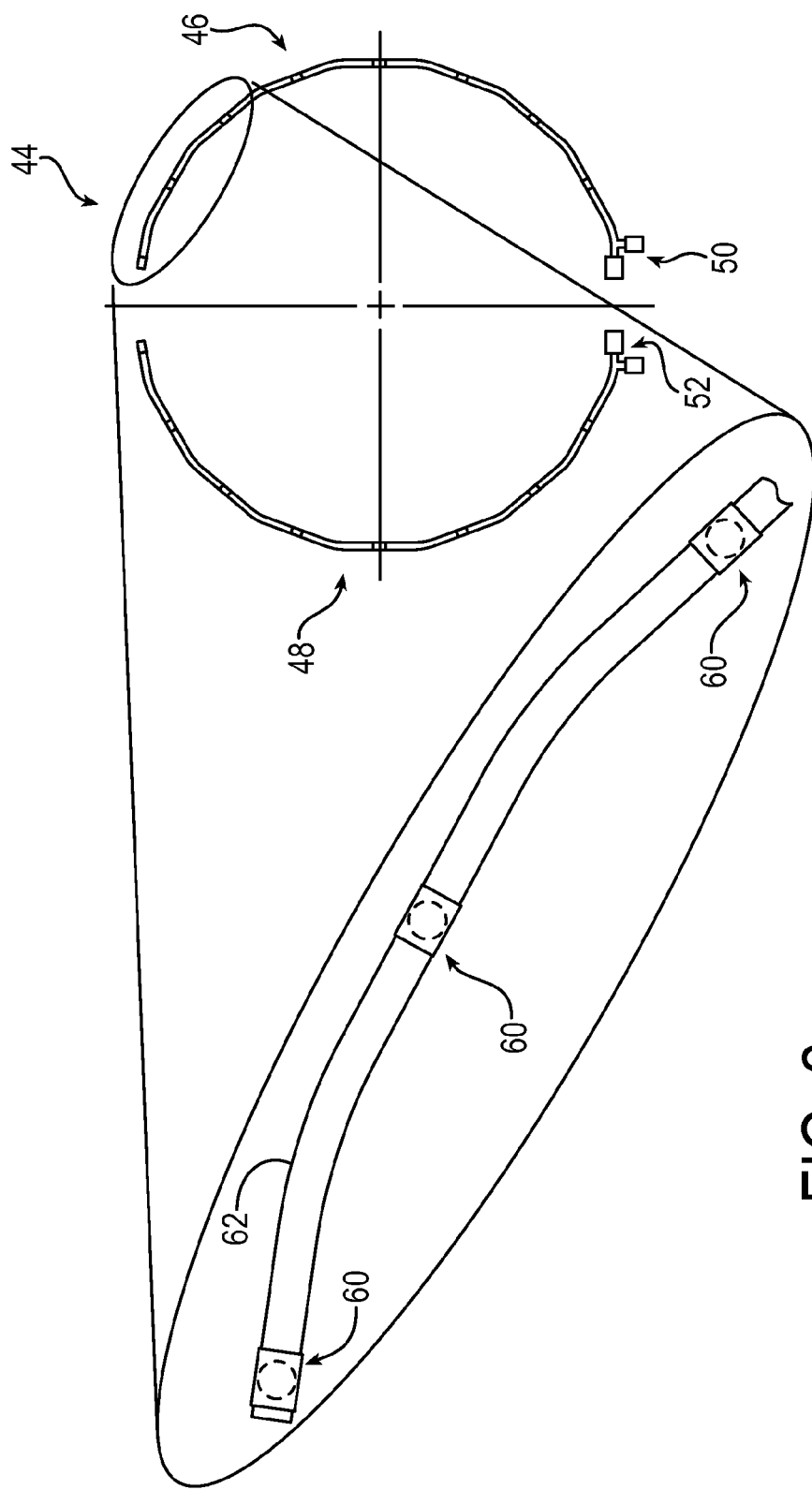
FIG. 2 is a side view of an exemplary manifold having two manifold halves.

Turning now to FIG. 2, the fuel manifold 44 is shown including two halves 46 and 48, which may be substantially similar to one another, having respective inlets 50 and 52 for receiving fuel. Although shown in two halves, it will be appreciated that the manifold may be separated into thirds, fourths, be a single continuous manifold, etc. Each manifold half 46, 48 includes at least one manifold fitting 60, and in the illustrated embodiment a plurality of manifold fittings 60 that surround a manifold hose 62 that provides fuel from the manifold inlets to the plurality of manifold fittings.

Figure 3:
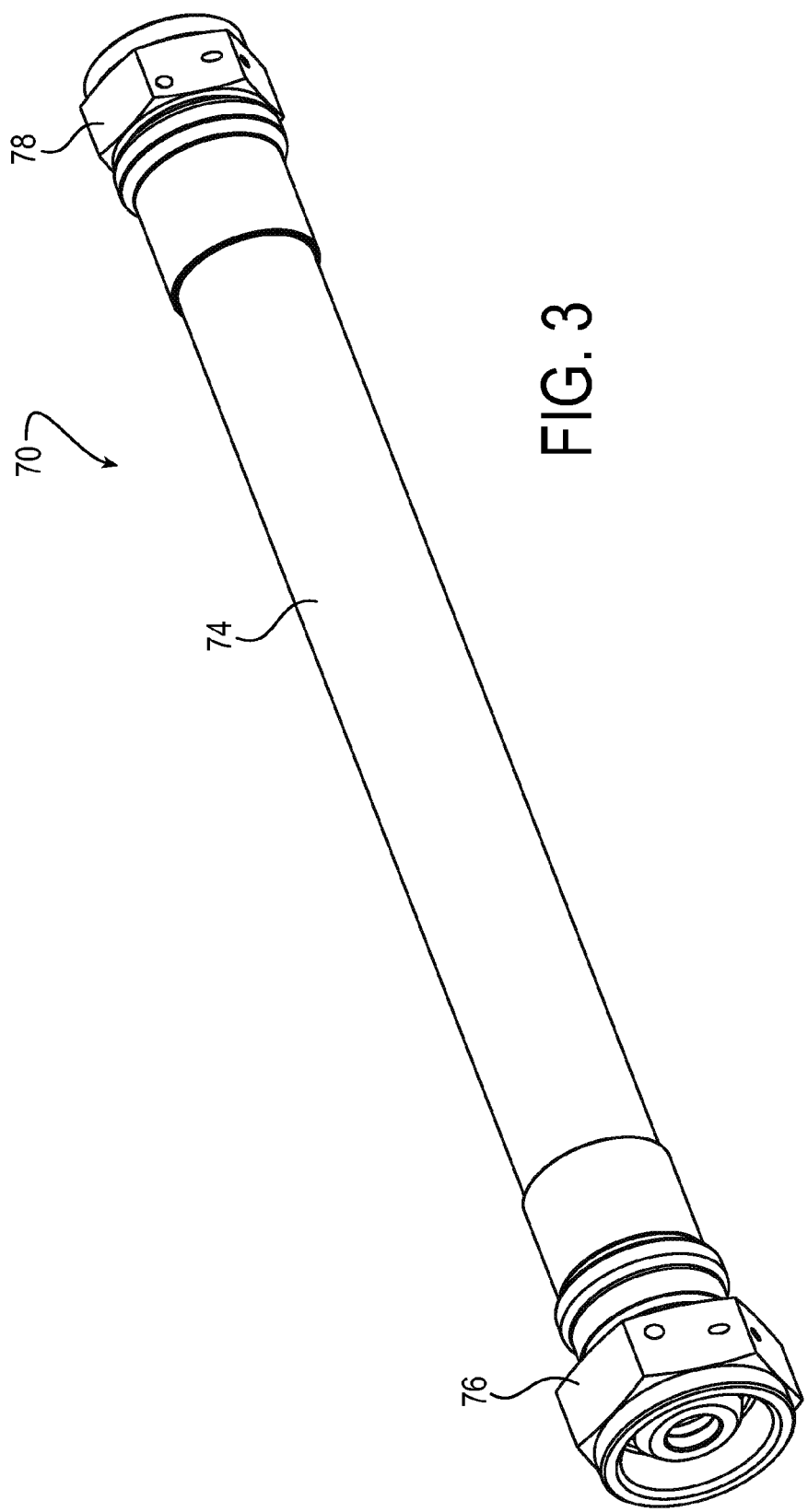
FIG. 3 is a perspective view of an exemplary flexible hose assembly according to the invention.

Turning now to FIG. 3, an exemplary flexible hose assembly 70 is shown. The flexible hose assembly includes an inner hose assembly 72 (FIG. 4), an outer hose assembly 74 surrounding the inner hose assembly 72, a first fitting 76 configured to be coupled to the outer hose assembly 74 and the manifold fitting 60, and a second fitting 78 configured to be coupled the outer hose assembly 74 and the injector 30 so that fuel in the manifold 44 can be distributed to the injector 30. The fittings 76 and 78 may be coupled to the manifold fitting 60 and injector 30 in any suitable manner, such as by a threaded connection. It will be appreciated that a plurality of flexible hose assemblies may be provided that couple to the plurality of manifold fittings 60 and a plurality of injectors 30. It will also be appreciated that the fitting 78 may be coupled to the manifold fitting 60 and the fitting 76 may be coupled to the injector 30, or that two fittings 76 or two fittings 78 may be coupled to both ends of the outer hose assembly.

Figure 4:
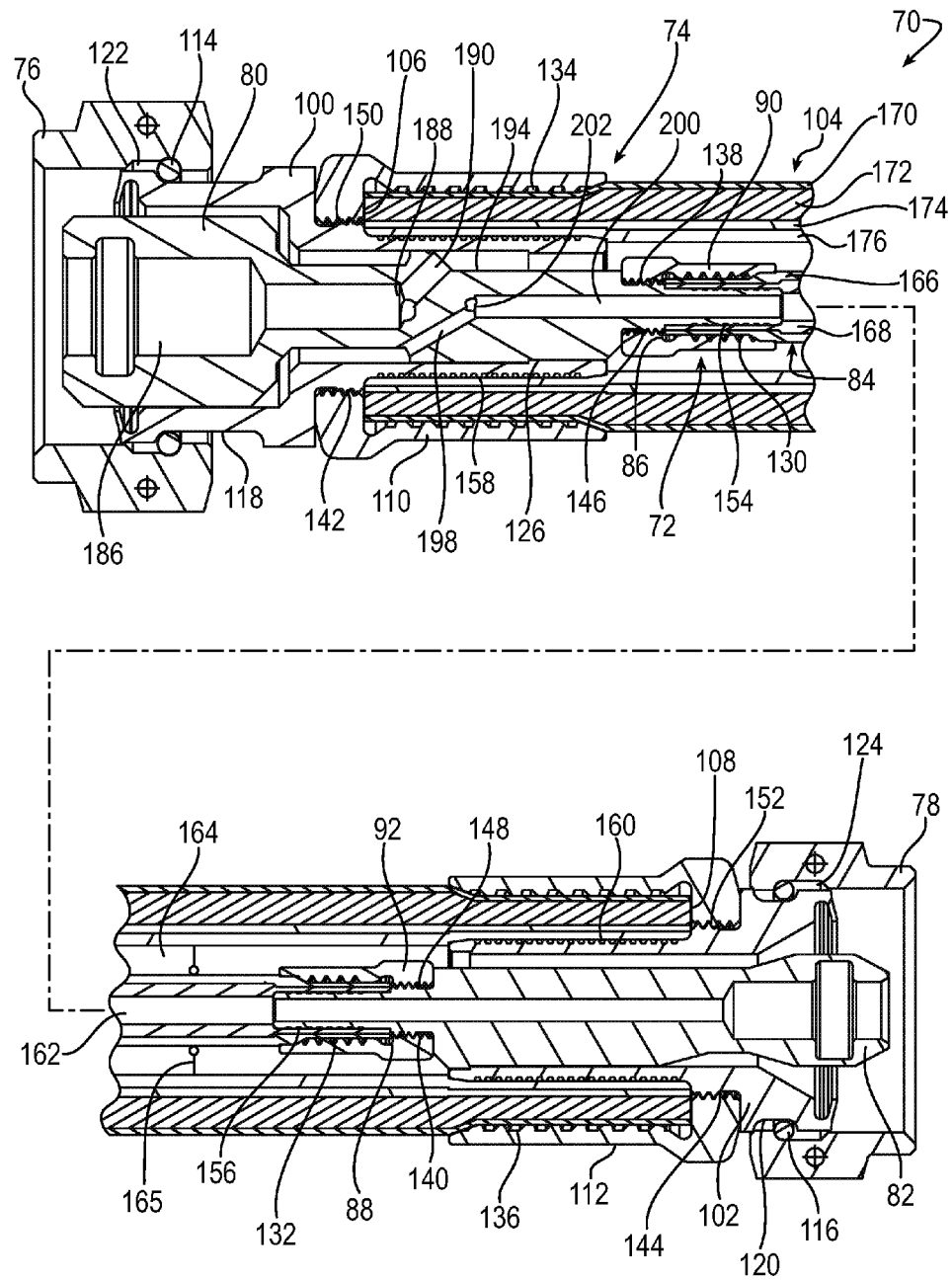
FIG. 4 is a cross-sectional view the exemplary flexible hose assembly taken substantially along the line A-A.
Figure 4A:
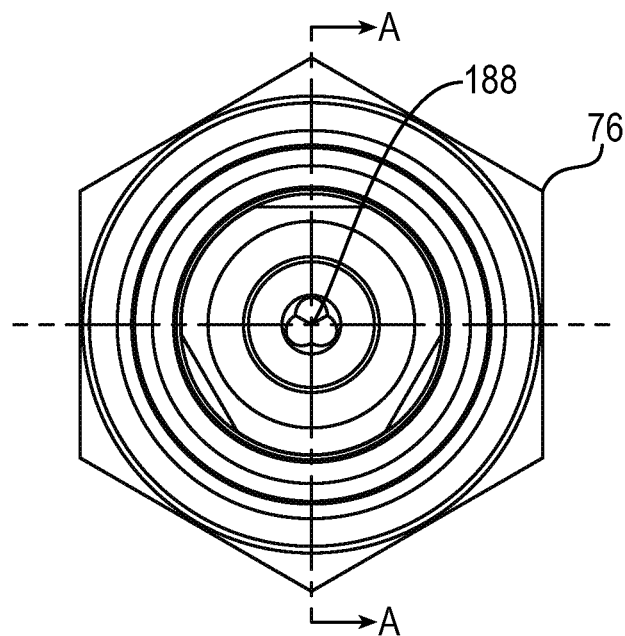
FIG. 4A is an end view of the exemplary flexible hose assembly.
Figure 5A:
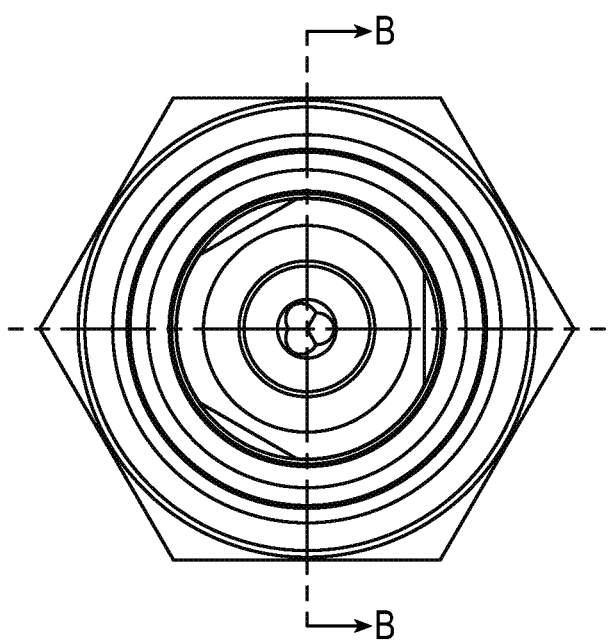
FIG. 5A is another end view of the exemplary flexible hose assembly.
Figure 5:
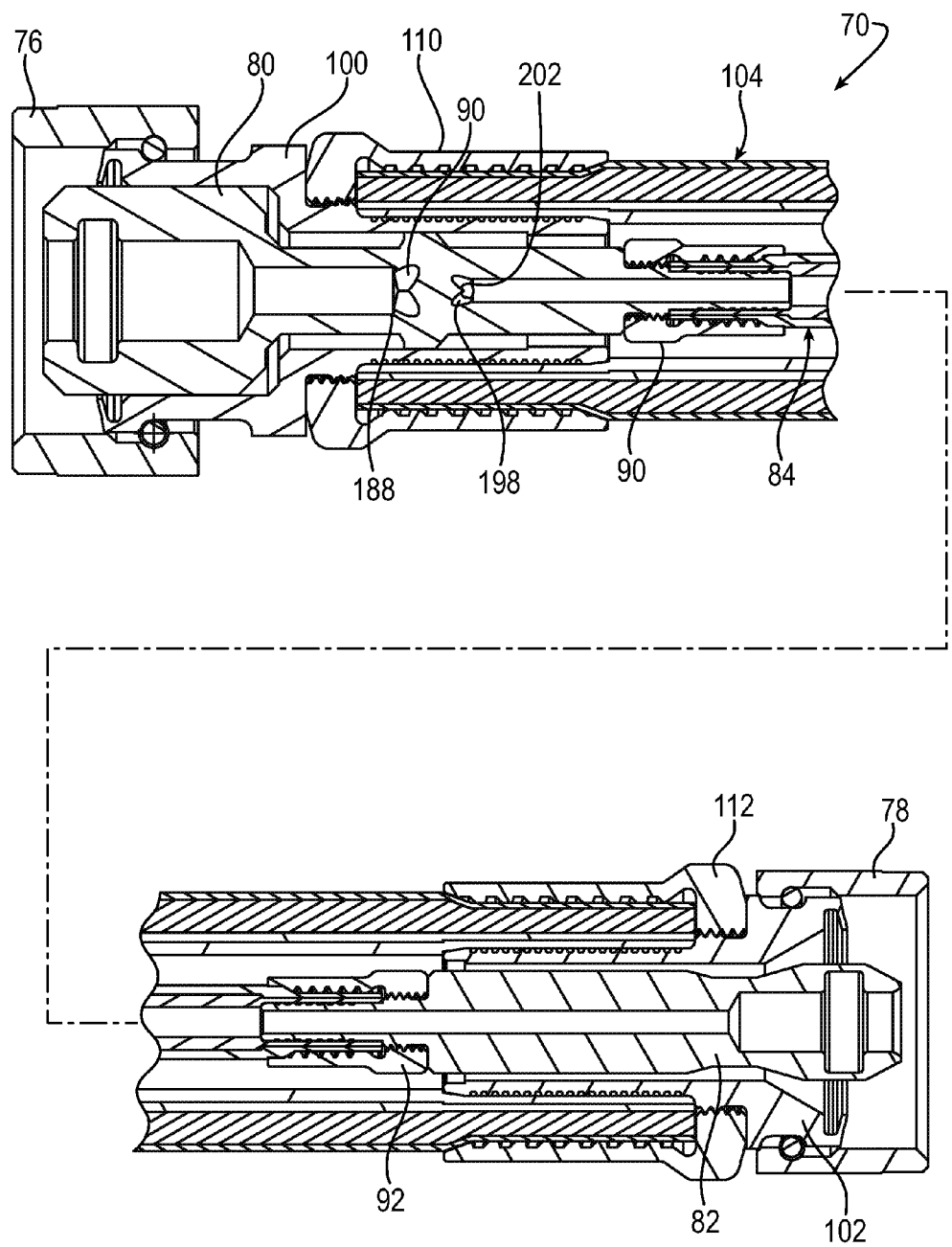
FIG. 5 is a cross-sectional view of the exemplary flexible hose assembly taken substantially along the line B-B.
Figure 6:
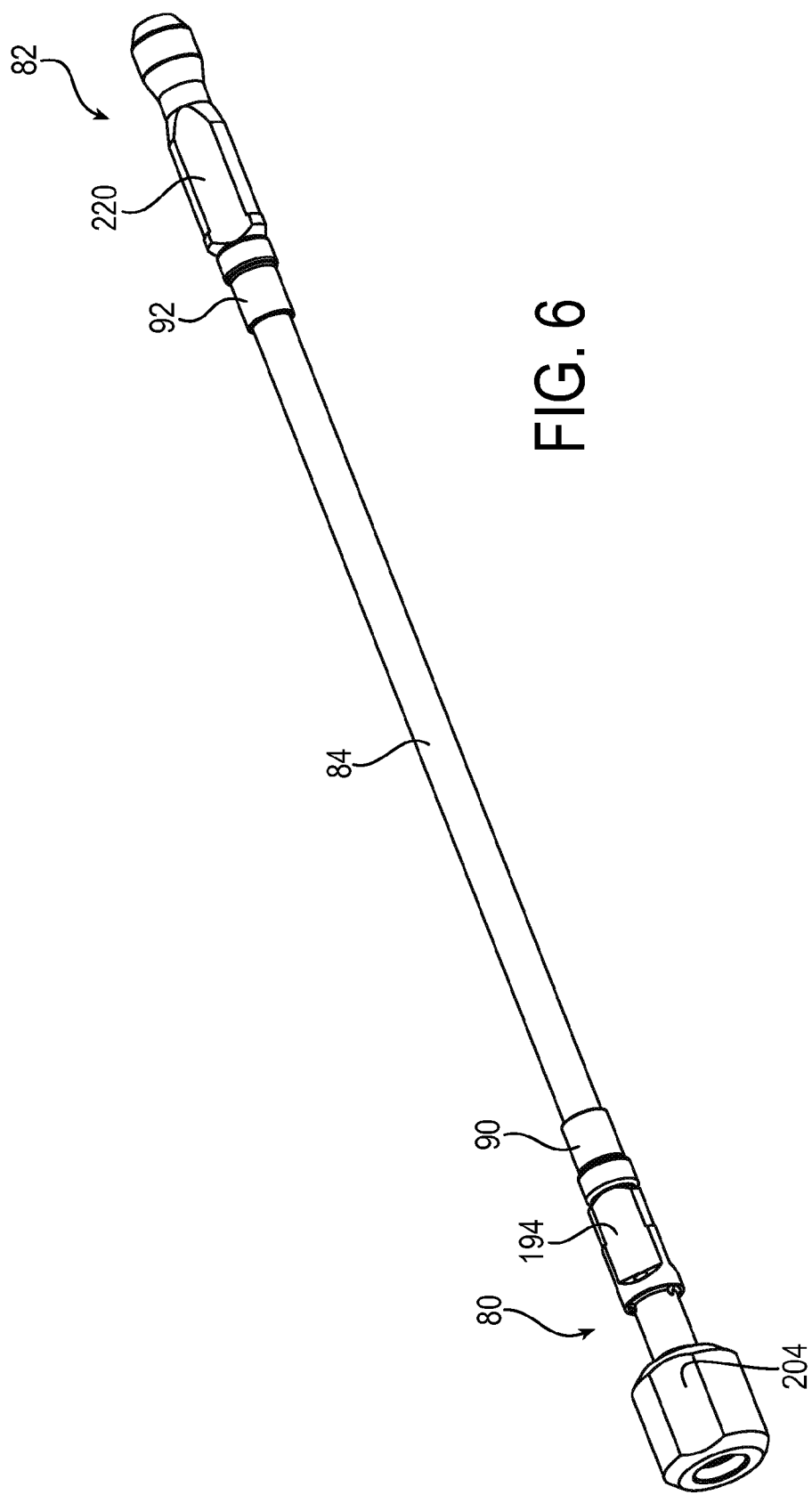
FIG. 6 is a perspective view of an exemplary inner hose assembly according to the invention.
Figure 7:
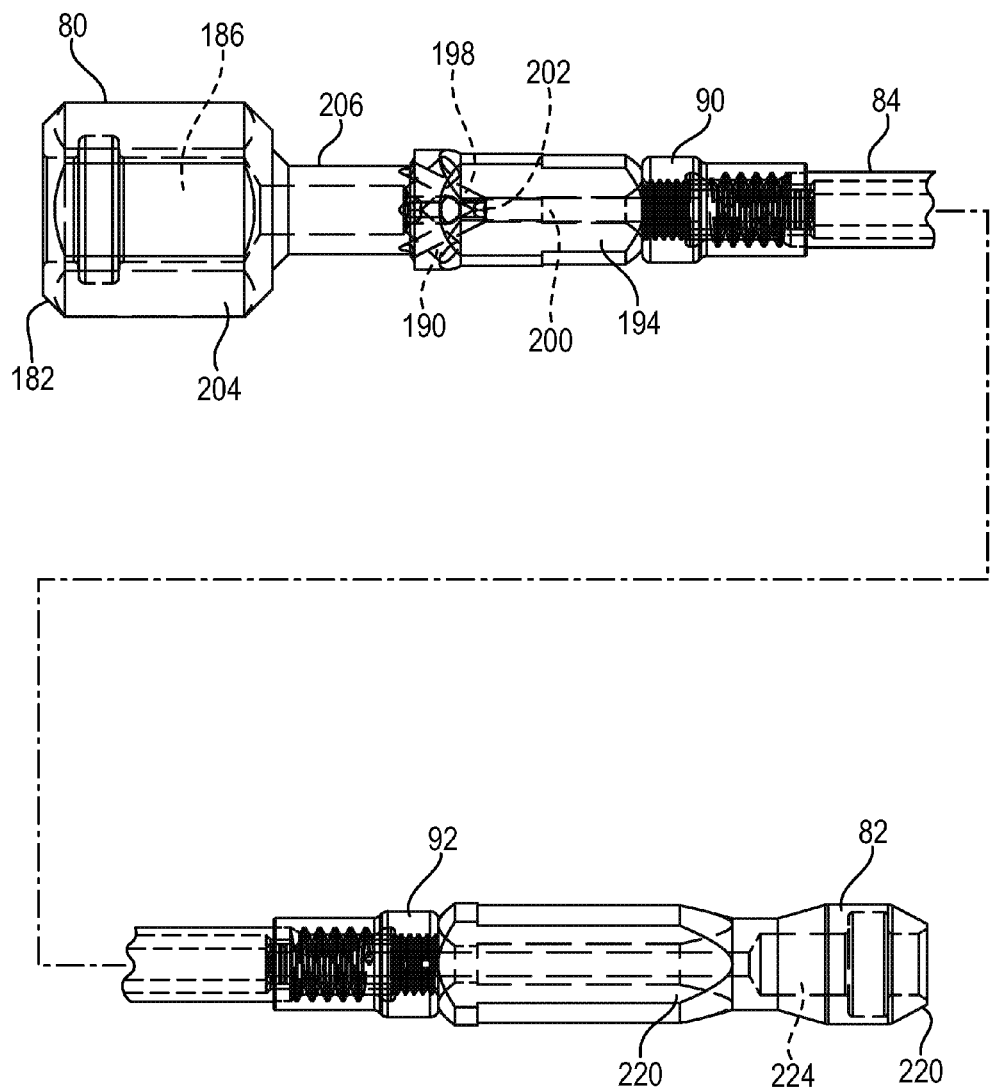
FIG. 7 is a side view of the exemplary inner hose assembly.
Figure 8:
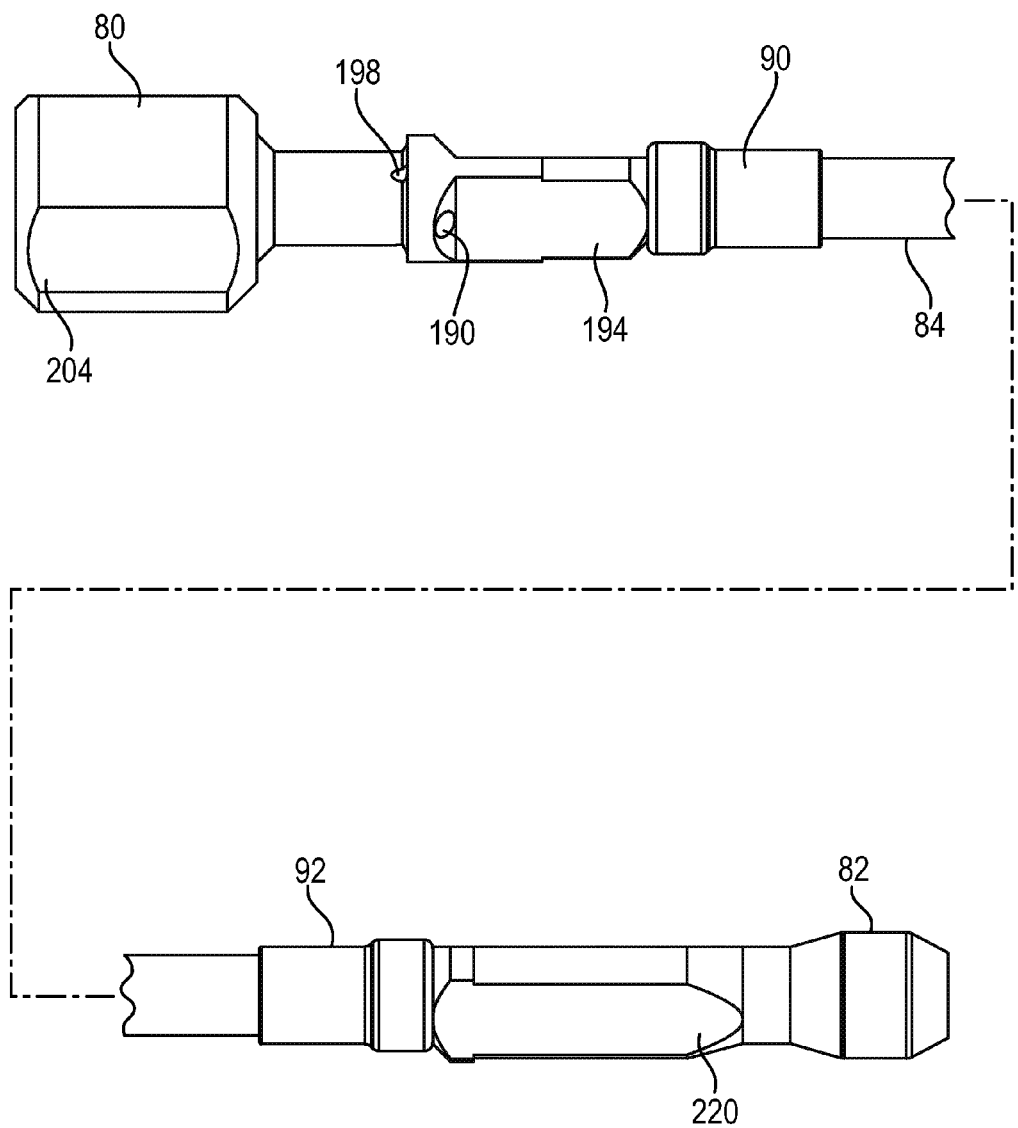
FIG. 8 is another side view of the exemplary inner hose assembly.
Figure 9:
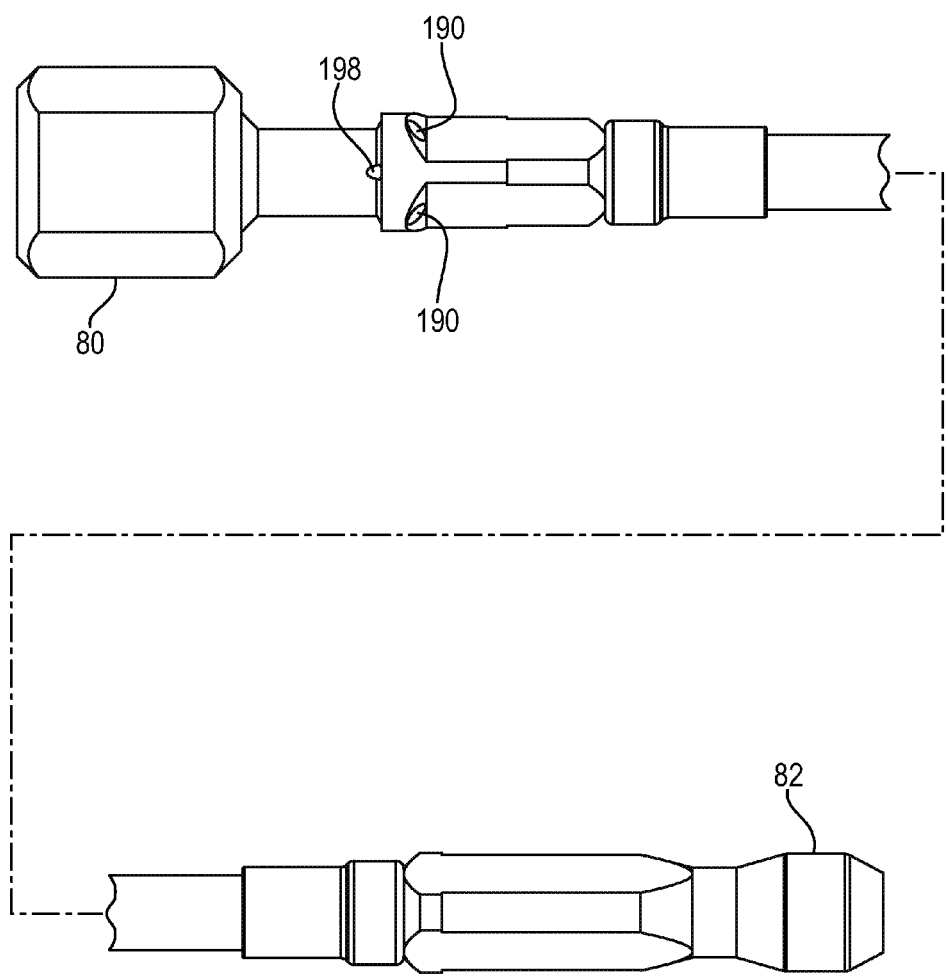
FIG. 9 is still another side view of the exemplary inner hose assembly.

Turning now to FIGS. 4 and 5, the inner hose assembly 72 includes first and second inner nipples 80 and 82, an inner flexible hose 84 having first and second ends 86 and 88 respectively coupled to the first and second inner nipples 80 and 82, and first and second connectors 90 and 92 respectively coupled to the first and second inner nipples 80 and 82 and the first and second ends 86 and 88 of the inner flexible hose 84. Similarly, the outer hose assembly 74 includes first and second outer nipples 100 and 102, an outer flexible hose 104 having first and second ends 106 and 108 respectively coupled to the first and second outer nipples 100 and 102, and first and second connectors 110 and 112 respectively coupled to the first and second outer nipples and the first and second ends 106 and 108 of the outer flexible hose 104. The first and second outer nipples 100 and 102 may be coupled to the first and second fittings 76 and 78 respectively in any suitable manner, such as by respective thrust wires 114 and 116 received in respective grooves 118 and 120 in the outer nipples and respective grooves 122 and 124 in the fittings 76 and 78. The first inner nipple 80 can be coupled to the first outer nipple 100 in any suitable manner, such as by welding or brazing at 126 around a circumference of the inner nipple 80 between converging and diverging passages, thereby providing a seal around the circumference of the inner nipple 80. The second inner nipple 82 may be slip fit to the second outer nipple 102.

The connectors 90, 92, 110 and 112 may be coupled to the respective nipples 80, 82, 100, and 102 and the respective flexible hoses 84 and 104 in any suitable manner. For example, the connectors may include respective grooves 130, 132, 134 and 136 on inner surfaces thereof and respective threaded openings 138, 140, 142 and 144 configured to be seated on and threadably connected to threads 146, 148, 150 and 152 on outer surfaces of the respective nipples 80, 82, 100 and 102. The respective grooves 130, 132, 134 and 136 may bite into the respective outer surfaces of the flexible hoses 84 and 104 at the respective ends to form crimped sealing connections. The crimping then causes respective grooves 154, 156, 158 and 160 on the outer surfaces of the respective nipples to bite into an inner surface of the respective flexible hoses to formed a crimped connection. In this way, the flexible hoses 84 and 104 can be securely coupled to the inner nipples 80 and 82 and the outer nipples 100 and 102, respectively.

When the inner and outer hose assemblies 72 and 74 are coupled together, the inner and outer flexible hoses 84 and 104 are concentric with the outer flexible hose 104 surrounding the inner flexible hose 84. The inner flexible hose 84 has a first fluid passage 162 formed interiorly of the inner flexible hose 84 for conveying fluid therethrough, such as fuel, and the outer flexible hose 104 forms with an outer wall of the inner flexible hose 84 a second fluid passage 164 for conveying fluid therethrough, such as fuel. The passages are separated and sealed from one another from the manifold 44 to the injector 30 and eliminate the need for multiple hoses running from a manifold to each injector. It will be appreciated that although described as providing two passages, more than two passages may be provided in the flexible hose assembly.

To provide internal support for the outer flexible hose 104 while also allowing for flow of fuel through the second fluid passage 164, one or more aligning rings 165 may be provided between the inner flexible hose 84 and the outer flexible hose 104. The aligning rings prevent an inner wall of the outer flexible hose 104 from contacting an outer wall of the inner flexible hose 84 to maintain a gap between the hoses. The aligning rings may have, for example, a circular portion surrounding the inner flexible hose 84 and a plurality of protrusions extending radially outward from the circular portion that contact the inner wall of the outer hose 104, which will allow fuel flow between the aligning rings to pass freely. Additionally or alternatively, a support spring, such as a wound spring extending at least partially along the length of a hose, may be provided interiorly of one or both of the flexible hoses to provide support for the respective hose when the pressure around the respective hose is greater than pressure inside the hose.

Each of the inner and outer flexible hoses 84 and 104 are formed by a plurality of layers. For example, the inner flexible hose 84 may include an outer layer 166 and a polymeric layer 168 surrounded by the outer layer 166. The outer layer 166 may be a metallic layer, such as a stainless steel layer, such as a braided stainless steel layer, or the outer layer may be a non-metallic layer, such as an aramid layer, and the polymeric layer 168 may be any suitable polymeric layer, such as a PTFE layer. The outer flexible hose 104 may include an outer braided stainless steel layer 170, an insulating layer 172 surrounded by the outer layer 170, an inner braided stainless steel layer 174 surrounded by the insulating layer 172, and fluoroplastic layer, such as a PTFE layer 176 surrounded by the inner braided layer 174. The various layers may be coupled together in any suitable manner, such as by a slip fit. It will be appreciated that the inner flexible hose 84 may also include an insulating layer. It will also be appreciated that the inner and outer hoses 84 and 104 may be flexible metal hoses.

During staging of the gas turbine, for example, one of the fluid passages 162 and 164 may be in a low flow or no flow condition, which may result in stagnant fuel collecting in the fuel passage. Fuel flowing through the other of the fuel passages acts to cool the fuel passage in the low flow or no flow condition to prevent the stagnant fuel from heating up and coking. When the engine is started for example, fuel may be provided through the first fluid passage 162. As the engine increases in speed, the second fluid passage 164 is opened and fuel provided to the engine through the second fluid passage. The first fluid passage 162 can then be at least partially closed, i.e. be in the low flow or no flow condition, and the flow through the second fluid passage will act to cool the first fluid passage. Alternatively, the second fluid passage 162 can be at least partially closed, i.e. be in the low flow or no flow condition, and the flow through the first fluid passage will act to cool the second fluid passage.

Referring now to FIGS. 6-17, the inner hose assembly 72 will be discussed in detail. As noted above, the inner hose assembly 72 includes first and second inner nipples 80 and 82, the inner flexible hose 84, and first and second connectors 90 and 92. The first inner nipple 80 has a proximal portion 182 proximate the manifold fitting 60, a distal portion 184, and a first bore 186 extending from the proximal portion 182 to an inner portion 188, which may be a closed inner end. The distal portion 184 is surrounded by the first end 86 of the inner flexible hose 84 and the connector 90, and includes the grooves 154 and threads 146 that couple to the flexible hose 84 and connector 90, respectively as discussed above.

Figure 10:
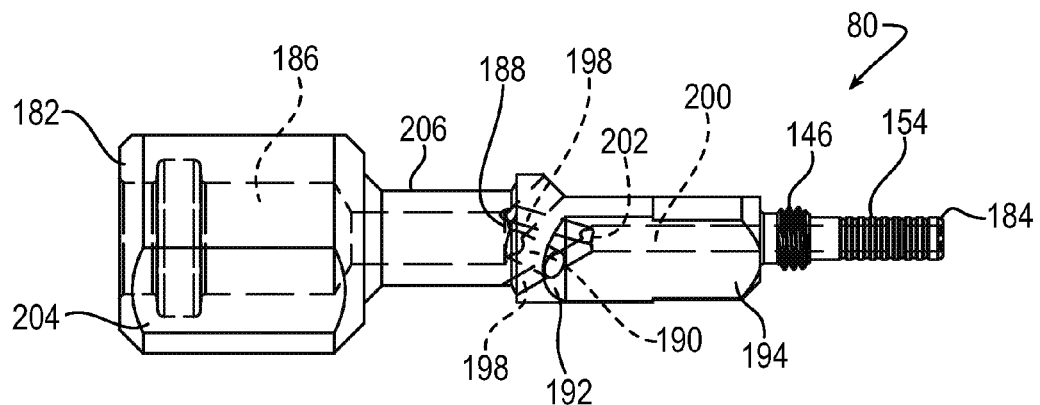
FIG. 10 is a side view of an exemplary first inner nipple of the inner hose assembly.
Figure 10A:
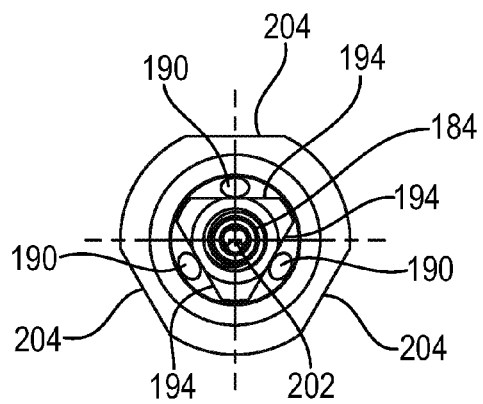
FIG. 10A is a distal end view of the exemplary first inner nipple.
Figure 12:
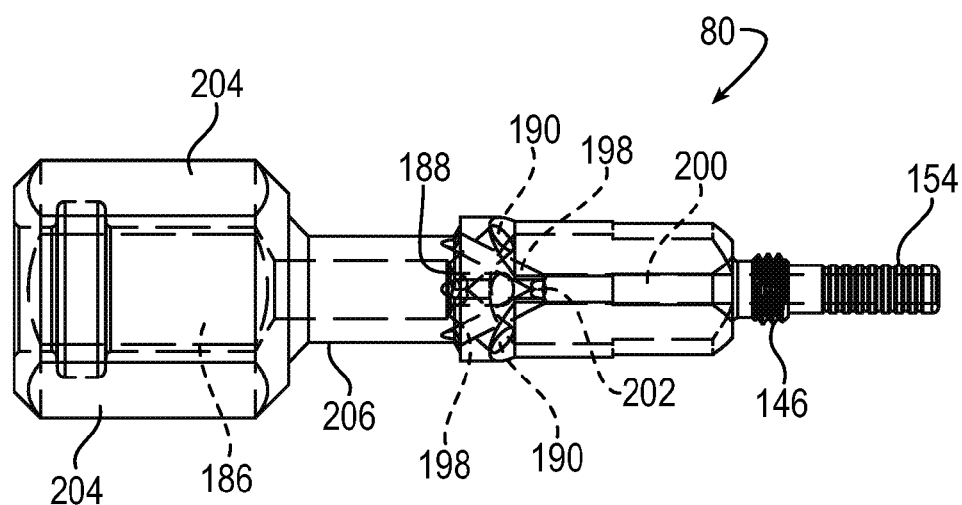
FIG. 12 is another side view of the exemplary first inner nipple.

As best shown in FIGS. 10 and 12, the first inner nipple 80 has one or more diverging passages 190, and in the illustrated embodiment three diverging passages extending outwardly from the first bore 186 at the inner portion 188 to an outer surface 192 of the inner nipple 80. One or more flats 194, and in the illustrated embodiment three flats, are provided on the outer surface 192 of the inner nipple 80 for each of the one or more diverging passages 190. The one or more flats 194 define with an inner surface 196 (FIG. 18) of the outer nipple 100 a first flow path from the diverging passages 190 to the distal portion 184 of the first inner nipple 80. A path for a second fluid, such as a main circuit, to the second fluid passage 164 is formed by the first bore 186, the one or more diverging passages 190, and the first flow path defined by the one or more flats 194 and the inner surface 196 of the outer nipple 100.

The first inner nipple 80 additionally has one or more converging passages 198, and in the illustrated embodiment three converging passages extending inwardly from the outer surface 192 of the inner nipple to a second bore 200 downstream of the first bore 186. The second bore 200 extends from a second inner portion 202 of the first inner nipple 80, which may be a closed inner end, to the distal portion 184 of the first inner nipple 80. One or more flats 204, and in the illustrated embodiment three flats are provided on the outer surface 192 of the inner nipple on the proximal portion 182 for each of the one or more converging passages 198.

The one or more flats 204 and an intermediate portion 206 of the inner nipple 80 downstream of the one or more flats define with the inner surface 196 of the outer nipple 100 a second flow path from the proximal portion 182 of the inner nipple to the converging passages 198. A path for a first fluid, such as a pilot circuit, to the first fluid passage 162 is formed by the second flow path defined by the one or more flats 204 and the inner surface 196 of the outer nipple 100, the one or more converging passages 198, and the second bore 200.

As should be appreciated, fluid flowing through the first bore 186 does not communicate with fluid flowing through the second bore 200. It will be appreciated that the flats 194 and 204 may be provided on the outer surface 192 of the first inner nipple 80 and/or the inner surface 196 of the first outer nipple 100.

Figure 11:
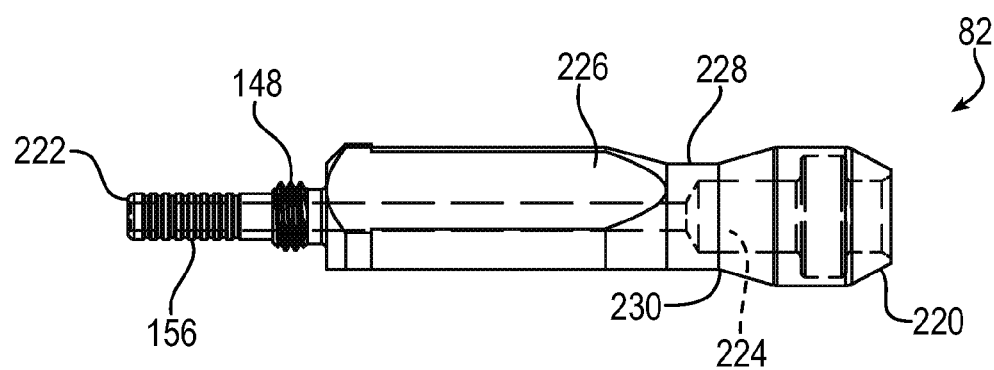
FIG. 11 is a side view of an exemplary second inner nipple of the inner hose assembly.
Figure 11A:
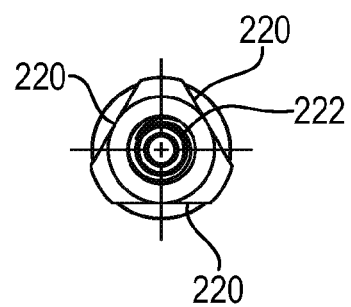
FIG. 11A is a distal end view of the exemplary second inner nipple.
Figure 13:
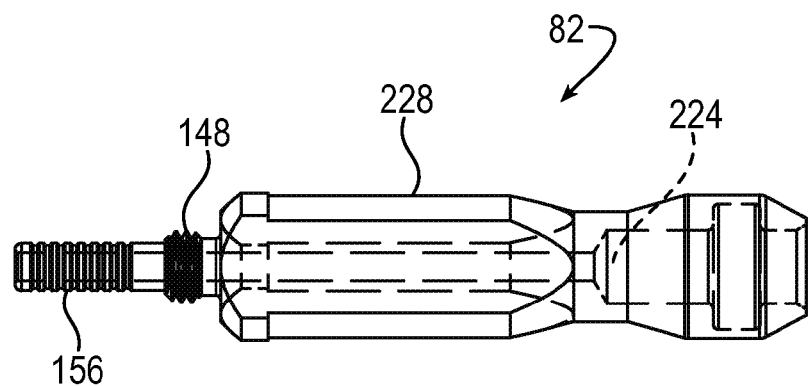
FIG. 13 is another side view of the exemplary second inner nipple.
Figure 14:
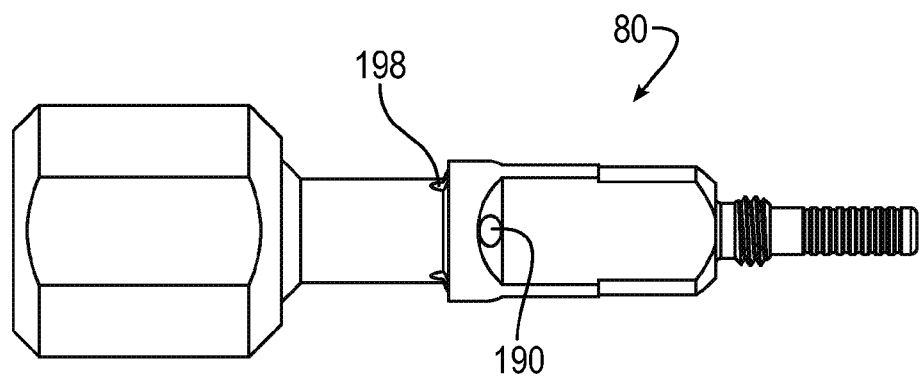
FIG. 14 is still another side view of the exemplary first inner nipple.
Figure 14A:
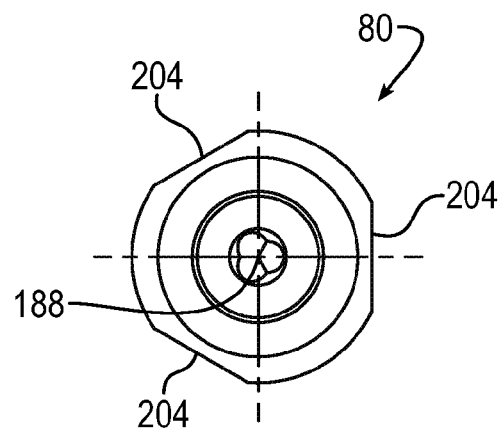
FIG. 14A is a proximal end view of the exemplary first inner nipple.
Figure 15:
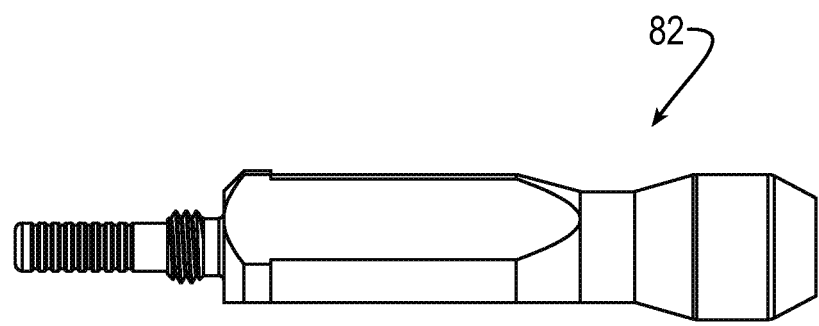
FIG. 15 is still another side view of the exemplary second inner nipple.
Figure 15A:
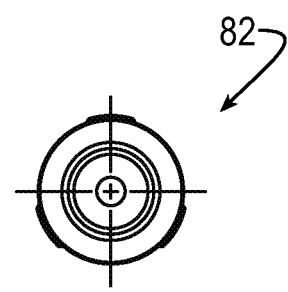
FIG. 15A is proximal end view of the exemplary first inner nipple.
Figure 16:
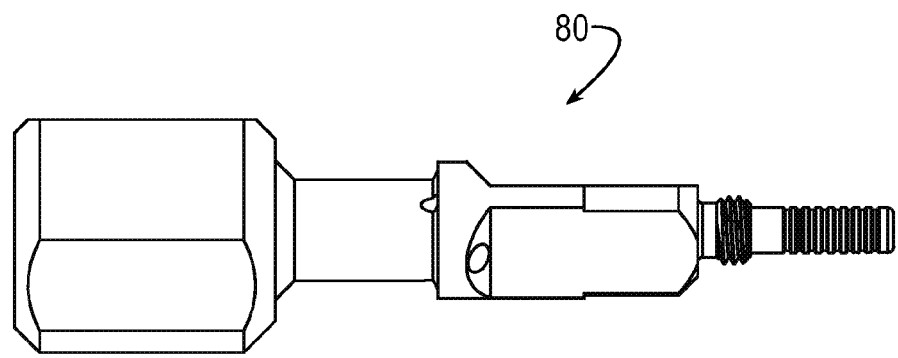
FIG. 16 is a further side view of the exemplary first inner nipple.
Figure 17:
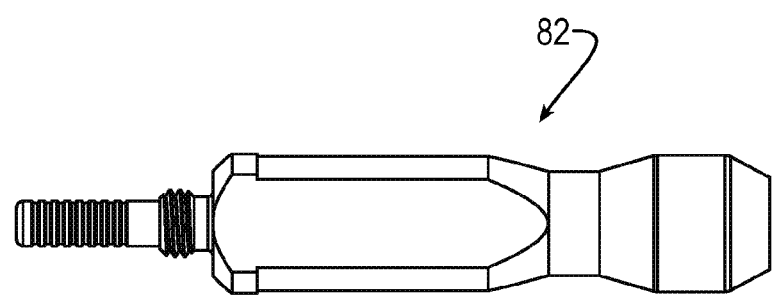
FIG. 17 is a further side view of the exemplary second inner nipple.

Referring now to FIGS. 11 and 13, the second inner nipple 82 of the inner hose assembly 72 has a proximal portion 220 proximate the injector 30, a distal portion 222, and a passage 224 extending from the proximal portion 220 to the distal portion 224. The passage 224 is in fluidic communication with the first flow passage 162 to deliver the first fluid to the injector 30. The distal portion 222 is surrounded by the second end 88 of the inner flexible hose 84 and the connector 92, and includes the grooves 156 and threads 148 that couple to the flexible hose 84 and connector 92, respectively as discussed above.

The second inner nipple 82 also has one or more flats 226, and in the illustrated embodiment three flats on an outer surface 228 of the second inner nipple 82. The one or more flats 226 and a portion 230 of the outer surface 228 of the second inner nipple 82 downstream of the one or more flats 226 define with an inner surface 232 (FIG. 19) of the second outer nipple 102 a flow path from the distal portion 222 of the second outer nipple 82 to the proximal portion 220. The flow path receives the second fluid from the second fluid passage 164 and directs the fluid to the injector 30.

Figure 18:
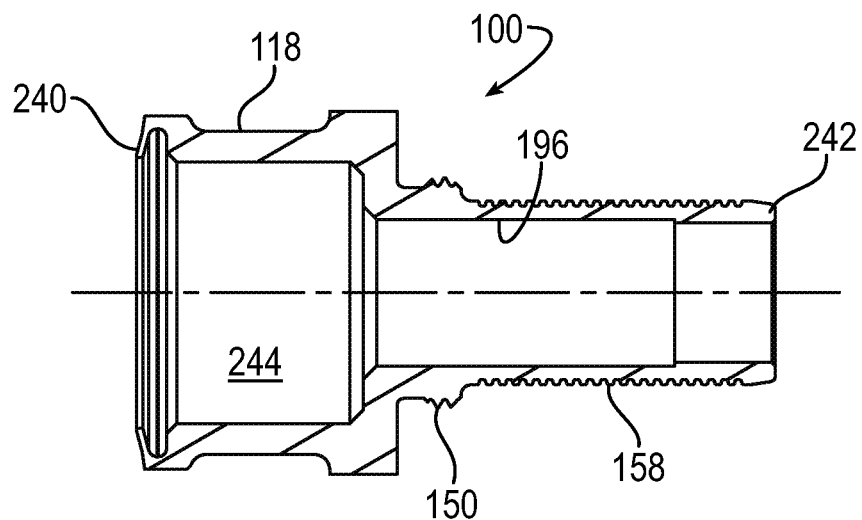
FIG. 18 is a cross-sectional view of an exemplary first outer nipple taken substantially along the line C-C.
Figure 18A:
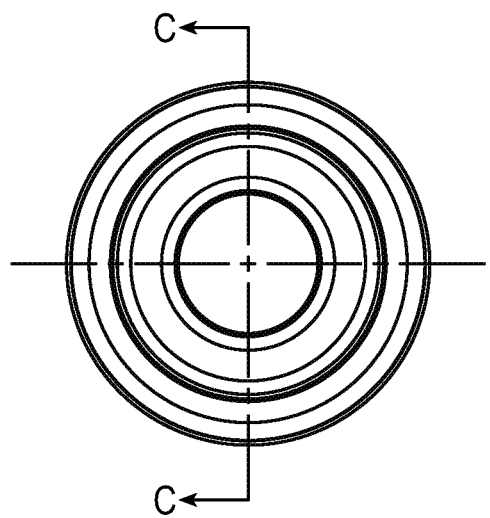
FIG. 18A is a proximal end view of the exemplary first outer nipple.
Figure 19:
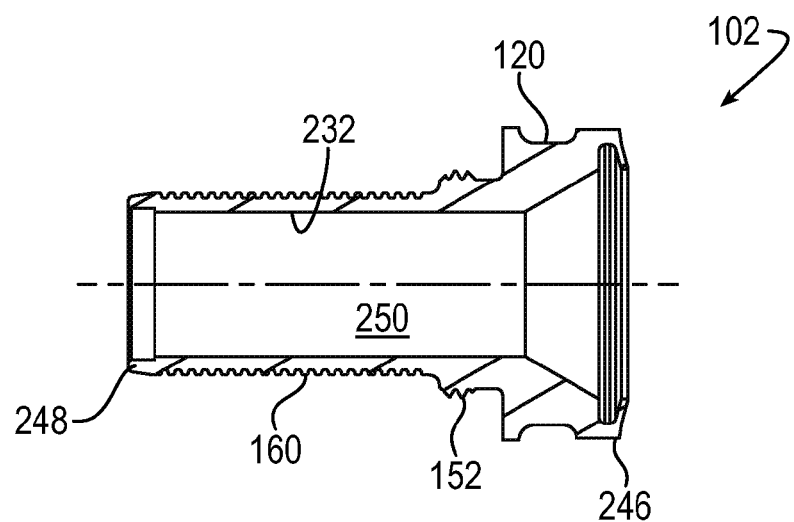
FIG. 19 is a cross-sectional view of an exemplary second outer nipple taken substantially along the line D-D.
Figure 19A:
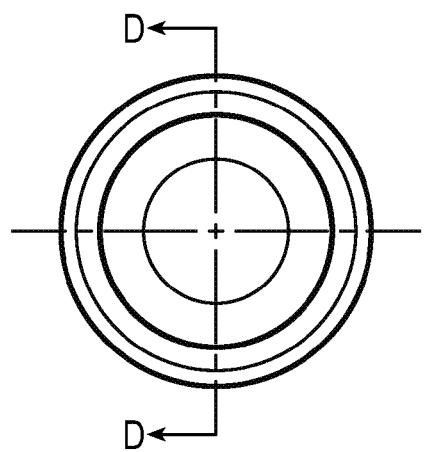
FIG. 19A is a proximal end view of the exemplary second outer nipple.

Referring now to FIGS. 3, 18 and 19, the outer hose assembly 74 will be discussed in detail. As noted above, the outer hose assembly 74 includes the first and second outer nipples 100 and 102, the outer flexible hose 104, and the connectors 110 and 112. The first outer nipple 100, which at least partially surrounds the first inner nipple 80, has a proximal portion 240 proximate the manifold fitting 60, a distal portion 242, and a passage 244 extending therethrough. The distal portion 242 is surrounded by the first end 106 of the outer flexible hose 104 and the connector 110, and includes grooves 158 and threads 150 that coupled to the flexible hose 104 and connector 110, respectively, as discussed above.

The second outer nipple 102, which at least partially surrounds the second inner nipple 82, has a proximal portion 246 proximate the injector 30, a distal portion 248, and a passage 250 extending therethrough. The distal portion 248 is surrounded by the second end 108 of the outer flexible hose 104 and the connector 112, and includes grooves 160 and threads 152 that coupled to the flexible hose 104 and connector 112, respective, as discussed above. Upon assembly of the inner and outer nipples, stops on the inner and outer nipples will prevent movement of the inner nipples relative to the outer nipples in a direction towards the injector.

After the inner and outer hose assemblies 72 and 74 are coupled together and the first and second fittings 76 and 78 are coupled to the manifold fitting 60 and injector 30 respectively, fuel can be conveyed from the manifold 44 to the injector 30 via the hose assembly 70. During operation, the first fuel flows from the manifold 44 through the second flow path defined by the inner surface 196 of the outer nipple 100, the one or more flats 204 and the intermediate portion 206, to the one or more converging passages 198. The fuel then flows through the converging passages 198 to the second bore 200, and then through the second bore to the first fuel passage 162. The fuel flows through the first passage 162 to the passage 224 in the second inner nipple 82, and then flows to the injector 30.

The second fuel flows from the manifold 44 to the first bore 186 in the first inner nipple 80. The fuel flows through the bore 186 to the closed inner portion 188, and then through the diverging passages 190 to the first flow path defined by the one or more flats 194 and the inner surface 196 of the outer nipple 100. The fuel then flows from the first flow path to the second fuel passage 164, and then to the flow path defined by the one or more flats 226, the portion 230 of the outer surface 228 of the second inner nipple 82 downstream of the flats, and the inner surface 232 of the second outer nipple 102. The fuel then flows from the flow path to the injector 30.

By directing the pilot circuit from the area in-between the first inner and outer nipples 80 and 100 inward, the inner flexible hose 84 can be provided with a smaller diameter than if the main circuit was flowing through the inner flexible hose 84, thereby providing a compact concentric hose assembly. Additionally, by directing the pilot flow inward and the main flow outward, the outer flexible hose 104 is prevented from collapsing on the inner flexible hose 84 when pressure of the pilot circuit flowing through the inner flexible hose 84 is greater than a pressure of the main circuit flowing through the outer flexible hose 104.

It will be appreciated that the fuel in the first fluid passage 162 flowing towards the injector may be directed to the area in-between the second inner nipple 82 and the second outer nipple 102 in a similar manner as fuel is directed outward in the first inner nipple 80 and first outer nipple 100. Similarly, the fuel in the second fluid passage 164 flowing towards the injector may be directed inward to the passage 224 in the second inner nipple 80 in a similar manner as fuel is directed inward in the first inner nipple 80 and first outer nipple 100. It will be appreciated that fuel flowing through the first inner nipple 80 may flow through the first fluid passage 162 and the fuel flowing in the area in-between the first inner nipple 80 and the first outer nipple 100 may flow through the second fluid passage 164 rather than being diverted outward and inward respectively. It will also be appreciated that the nipples may be any suitable shape, such as curved or angled to provide a curved or angled connection between the manifold fitting 60 and the inner and outer flexible hoses 84 and 104. The curved or angled connections may be provided to accommodate different plumbing and piping configurations in an engine.

Figure 20:
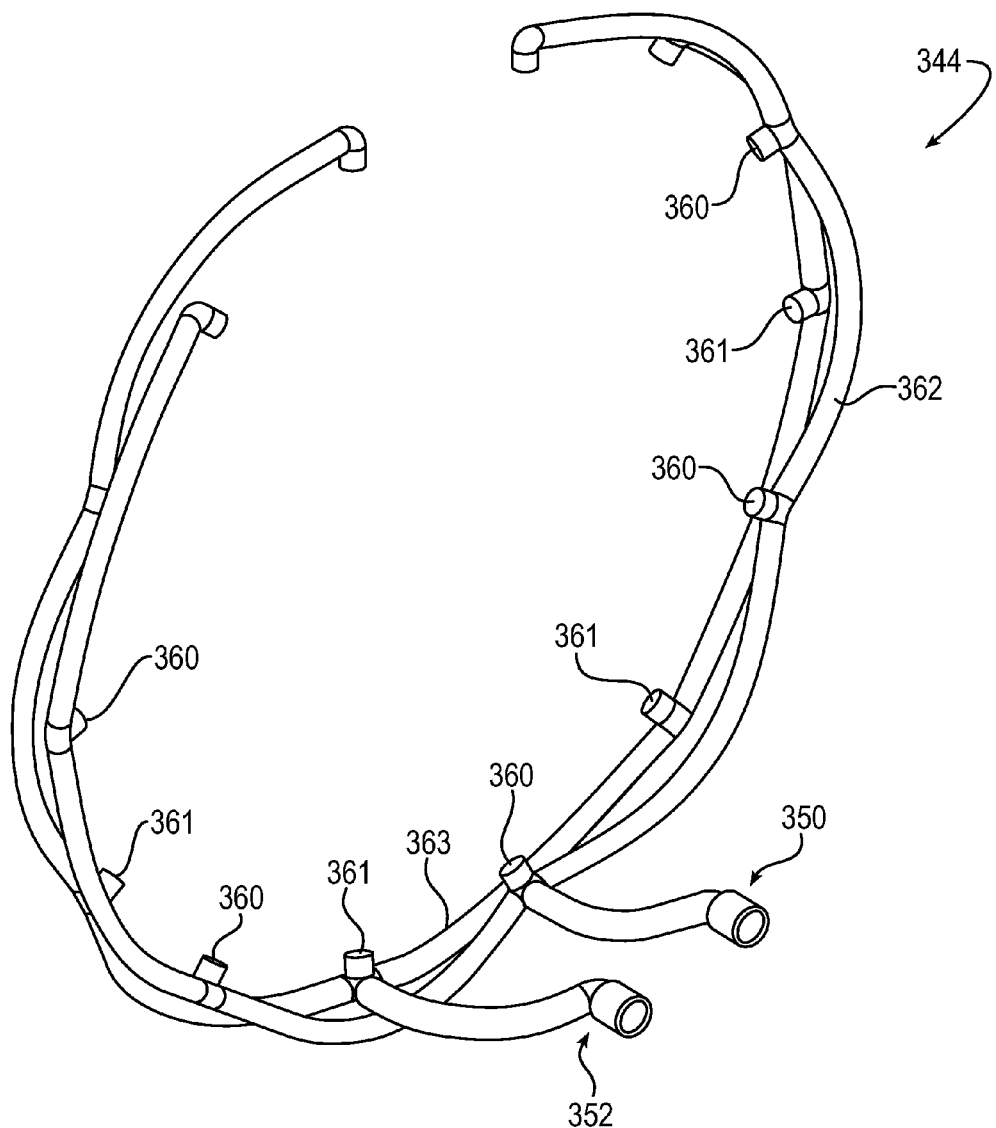
FIG. 20 is a side view of another exemplary manifold.

Turning now to FIG. 20, another embodiment of the manifold is shown at 344. The manifold 344 is a flexible manifold that includes inlet 350 having concentric hoses for receiving a first fluid and a second fluid, such as a main circuit and a first pilot circuit, and directing the fluids to manifold fittings 360. The manifold also includes inlet 352 having concentric hoses for receiving the first fluid and a third fluid, such as the main circuit and a second pilot circuit, and directing the fluids to the manifold fittings 361. The manifold fittings 360 and 361 surround manifold hoses 362 and 363, respectively, that provide the fluids from the manifold inlets 350 and 352 to the manifold fittings 360 and 361.

The first and second pilot circuits may have different flow rates or may have the same flow rates, and the flow rates may be varied during use. The first and second pilot circuits may be provided to an inner hose of the concentric hoses in the manifold inlets 350 and 352. By providing the pilot circuits to the inner hose, a more compact manifold may be provided. Additionally, by splitting up the pilot circuits and the main circuit, smaller hose diameters may be provided thereby providing a more compact manifold.

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A flexible hose assembly configured to be coupled to a manifold, the flexible hose assembly including:
   an inner hose assembly having:
      a first inner nipple having a proximal portion and a distal portion and a first bore extending from the proximal portion to an inner portion of the first inner nipple;
      an inner flexible hose for conveying fluid through a first fluid passage formed interiorly of the inner flexible hose, the inner flexible hose having a first end receiving at least a portion of the distal portion of the first inner nipple therein and being coupled thereto; and
      a first connector exteriorly surrounding at least a portion of the inner flexible hose, receiving the distal portion of the first inner nipple therein, and coupled to the first inner nipple and the inner flexible hose;
   an outer hose assembly having:
      a first outer nipple at least partially exteriorly surrounding the first inner nipple and being coupled thereto, the first outer nipple having a proximal portion and a distal portion and a first outer nipple passage extending from the proximal portion of the first outer nipple to the distal portion of the first outer nipple;
      an outer flexible hose exteriorly surrounding the inner flexible hose and having a first end receiving at least a portion of the distal portion of the first outer nipple therein and being coupled thereto, the outer flexible hose forming with an outer wall of the inner flexible hose a second fluid passage; and
      a second connector exteriorly surrounding at least a portion of the outer flexible hose, receiving the distal portion of the first outer nipple therein, and coupled to the first outer nipple and the outer flexible hose.

2. The flexible hose assembly according to claim 1, wherein the first inner nipple has one or more diverging passages extending outwardly from the bore at the inner portion to an outer surface of the inner nipple.

3. The nipple assembly according to claim 2, further including one or more flats on an outer surface of the first inner nipple for each of the one or more diverging passages, wherein the one or more flats define with an inner surface of the first outer nipple a first flow path from the diverging passages to the distal portion of the first inner nipple.

4. A flexible hose assembly configured to be coupled to a manifold, the flexible hose assembly including:
   an inner hose assembly having:
      a first inner nipple having a proximal portion and a distal portion and a first bore extending from the proximal portion to an inner portion of the inner nipple;
      an inner flexible hose for conveying fluid through a first fluid passage formed interiorly of the inner flexible hose, the inner flexible hose having a first end surrounding at least a portion of the distal portion of the first inner nipple and being coupled thereto; and a first connector surrounding at least a portion of the inner flexible hose and the distal portion of the first inner nipple and being coupled to the nipple and the inner flexible hose;

an outer hose assembly having:

a first outer nipple at least partially surrounding the first inner nipple and being coupled thereto, the first outer nipple having a proximal portion and a distal portion and a first outer nipple passage extending from the proximal portion to the distal portion;

an outer flexible hose surrounding the inner flexible hose and having a first end surrounding at least a portion of the distal portion of the first outer nipple and being coupled thereto, the outer flexible hose forming with an outer wall of the inner flexible hose a second fluid passage; and a second connector surrounding at least a portion of the outer flexible hose and the distal portion of the first outer nipple and being coupled to the first outer nipple and the outer flexible hose;

wherein the first inner nipple has one or more diverging passages extending outwardly from the bore at the inner portion to an outer surface of the inner nipple, and one or more converging passages extending inwardly from the outer surface of the first inner nipple to a second bore extending from a second inner portion of the first inner nipple to the distal portion of the first inner nipple.

5. The nipple assembly according to claim 4, further including one or more flats on the outer surface of the first inner nipple on the proximal portion for each of the one or more converging passages, wherein the one or more flats and a portion of the outer surface of the first inner nipple downstream of the one or more flats define with the inner surface of the first outer nipple a second flow path from the proximal portion of the first inner nipple to the converging passages.

6. The nipple assembly according to claim 4, wherein fluid flowing through the first bore does not communicate with fluid flowing through the second bore.

7. The nipple assembly according to claim 1, wherein a path for a first fluid to the first fluid passage is formed by a second flow path defined by one or more flats on the outer surface of the first inner nipple on the proximal portion and the inner surface of the first outer nipple, one or more converging passages, and a second bore.

8. The nipple assembly according to claim 1, wherein a path for a second fluid to the second fluid passage is formed by the first bore, one or more diverging passages, and a first flow path defined by one or more flats on the outer surface of the first inner nipple and the inner surface of the first outer nipple.

9. The nipple assembly according to claim 1, wherein the inner and outer flexible hoses each include at least one metal layer and at least one PTFE layer.

10. The flexible hose assembly according to claim 1, further including one or more aligning rings for providing internal support for the outer flexible hose while also allowing for flow of fluid through the second fluid passage.

11. The flexible hose assembly according to claim 1, further including a fitting coupled to the first outer nipple and configured to be coupled to the manifold.

12. A flexible hose assembly configured to be coupled to a manifold, the flexible hose assembly including:

an inner hose assembly having:

a first inner nipple having a proximal portion and a distal portion and a first bore extending from the proximal portion to an inner portion of the inner nipple;

an inner flexible hose for conveying fluid through a first fluid passage formed interiorly of the inner flexible hose, the inner flexible hose having a first end surrounding at least a portion of the distal portion of the first inner nipple and being coupled thereto; and a first connector surrounding at least a portion of the inner flexible hose and the distal portion of the first inner nipple and being coupled to the nipple and the inner flexible hose;

an outer hose assembly having:

a first outer nipple at least partially surrounding the first inner nipple and being coupled thereto, the first outer nipple having a proximal portion and a distal portion and a first outer nipple passage extending from the proximal portion to the distal portion;

an outer flexible hose surrounding the inner flexible hose and having a first end surrounding at least a portion of the distal portion of the first outer nipple and being coupled thereto, the outer flexible hose forming with an outer wall of the inner flexible hose a second fluid passage; and a second connector surrounding at least a portion of the outer flexible hose and the distal portion of the first outer nipple and being coupled to the first outer nipple and the outer flexible hose;

wherein the inner hose assembly further includes:

a second inner nipple having a proximal portion and a distal portion and a passage extending from the proximal portion to the distal portion in fluidic communication with the first flow passage, wherein the inner flexible hose has a second end surrounding at least a portion of the distal portion of the second inner nipple and being coupled thereto; and a third connector surrounding at least a portion of the inner flexible hose and the distal portion of the second inner nipple and being coupled to the inner flexible hose and the second inner nipple.

13. The flexible hose assembly according to claim 12, wherein the outer hose assembly further includes:

a second outer nipple at least partially surrounding the second inner nipple, the second outer nipple having a proximal portion and a distal portion and a second outer nipple passage extending from the proximal portion of the second outer nipple to the distal portion of the second outer nipple, wherein the outer flexible hose has a second end surrounding at least a portion of the distal portion of the second outer nipple and being coupled thereto; and a fourth connector surrounding at least a portion of the outer flexible hose and the distal portion of the second outer nipple and being coupled to the second outer nipple and the outer flexible hose.

14. The flexible hose assembly according to claim 13, wherein the second inner nipple includes one or more flats on an outer surface of the second inner nipple, wherein the one or more flats and a portion of the outer surface of the second inner nipple downstream of the one or more flats define with an inner surface of the second outer nipple a flow path from the distal portion of the second outer nipple to the proximal portion of the second outer nipple.

15. The flexible hose assembly according to claim 12, further including a fitting coupled to the second outer nipple and configured to be coupled to an injector.

16. A fuel manifold for a gas turbine engine in combination with the flexible hose assembly according to claim 1, wherein the fuel manifold includes one or more manifold fittings surrounding a manifold hose, and wherein respective flexible hose assemblies are coupled to each of the one or more manifold fittings.

17. A flexible hose assembly configured to be coupled to a manifold, the flexible hose assembly including:
an inner hose assembly having an inner nipple and an inner flexible hose coupled to the inner nipple, the inner flexible hose having an interiorly formed first fluid passage for conveying fluid therethrough; and
an outer hose assembly having an outer nipple at least partially surrounding the inner nipple and an outer flexible hose coupled to the outer nipple and surrounding the inner flexible hose, the outer flexible hose forming with an outer wall of the inner flexible hose a second fluid passage,
wherein the inner nipple includes one or more diverging passages for directing fluid flowing through the inner nipple outward to the second fluid passage and one or more converging passages for directing fluid flowing in-between the inner and outer nipples inward to the first fluid passage.

18. The flexible hose assembly according to claim 17, wherein the inner nipple has a proximal portion and a distal portion and a first bore extending from the proximal portion to an inner portion of the inner nipple, wherein the outer nipple has a proximal portion and a distal portion and a passage extending from the proximal portion to the distal portion, and wherein the inner nipple has one or more diverging passages extending outwardly from the bore at the inner portion to an outer surface of the inner nipple.

19. The flexible hose assembly according to claim 17, further including:
one or more flats on the outer surface of the inner nipple for each of the one or more diverging passages, wherein the one or more flats define with an inner surface of the outer nipple a first flow path from the diverging passages to the distal portion of the inner nipple; and
one or more flats on the outer surface of the inner nipple on the proximal portion for each of the one or more converging passages, wherein the one or more flats and a portion of the outer surface of the inner nipple downstream of the one or more flats define with the inner surface of the outer nipple a second flow path from the proximal portion of the inner nipple to the converging passages.

20. A fuel manifold system for a gas turbine engine in combination with the flexible hose assembly according to claim 1, wherein the fuel manifold system includes:
a first fuel manifold having a first plurality of fuel injectors for being disposed about the gas turbine engine, and wherein respective flexible hose assemblies are coupled to each of the first plurality of fuel injectors, and
a second fuel manifold having a second plurality of fuel injectors for being disposed about the gas turbine engine, and wherein respective flexible hose assemblies are coupled to each of the second plurality of fuel injectors,
wherein the first plurality of fuel injectors and the second plurality of fuel injectors are disposed in an alternating arrangement about the gas turbine engine.

\* \* \* \* \*